United States Patent [19]
Findley et al.

[11] 3,877,670
[45] Apr. 15, 1975

[54] EXTENSIBLE SUPPORT STRUCTURE

[75] Inventors: Samuel A. Findley; Francis C. Rieger, both of Bronson, Mich.

[73] Assignee: The Scott & Fetzer Company, Bronson, Mich.

[22] Filed: Apr. 18, 1973

[21] Appl. No.: 352,447

[52] U.S. Cl............................ 248/298; 248/354 R
[51] Int. Cl............................................. A45c 13/02
[58] Field of Search .......... 248/298, 295, 287, 285, 248/286, 161, 411, 157, 337, 354 R; 403/374, 109

[56] References Cited
UNITED STATES PATENTS

| | | | |
|---|---|---|---|
| 1,852,785 | 4/1932 | Moehler............................. | 403/109 |
| 2,945,660 | 7/1960 | Slavsky et al...................... | 248/161 |

FOREIGN PATENTS OR APPLICATIONS

| | | | |
|---|---|---|---|
| 221,718 | 10/1910 | Germany.......................... | 248/354 R |
| 488,094 | 12/1929 | Germany.......................... | 248/354 R |
| 493,339 | 2/1930 | Germany.......................... | 248/354 R |
| 682,384 | 11/1952 | United Kingdom............. | 248/354 R |
| 742,628 | 12/1955 | United Kingdom............. | 248/354 R |

OTHER PUBLICATIONS

Patentanmeldung, Germany, Hans–Jaachim Raab, July 1956, No. 19068 VI/5c, 248–354 R.

*Primary Examiner*—J. Franklin Foss
*Attorney, Agent, or Firm*—Hill, Gross, Simpson Van Santen, Steadman, Chiara & Simpson

[57] ABSTRACT

An extensible support structure comprising a housing formed of a pair of U-shaped members arranged to form an elongated passageway which telescopically receives a third member characterized by a rod and cam arrangement extending through aligned apertures in the first and second members and slots in the third member for forcing the first and second members into clamping engagement with the third member to frictionally lock the third member in a selected axial position within the housing. Preferably, each of the members forming the housing has a pair of flat surfaces extending the length which coact with four flat surfaces provided on the third member to provide engagement surfaces through which the clamping force is applied.

11 Claims, 5 Drawing Figures

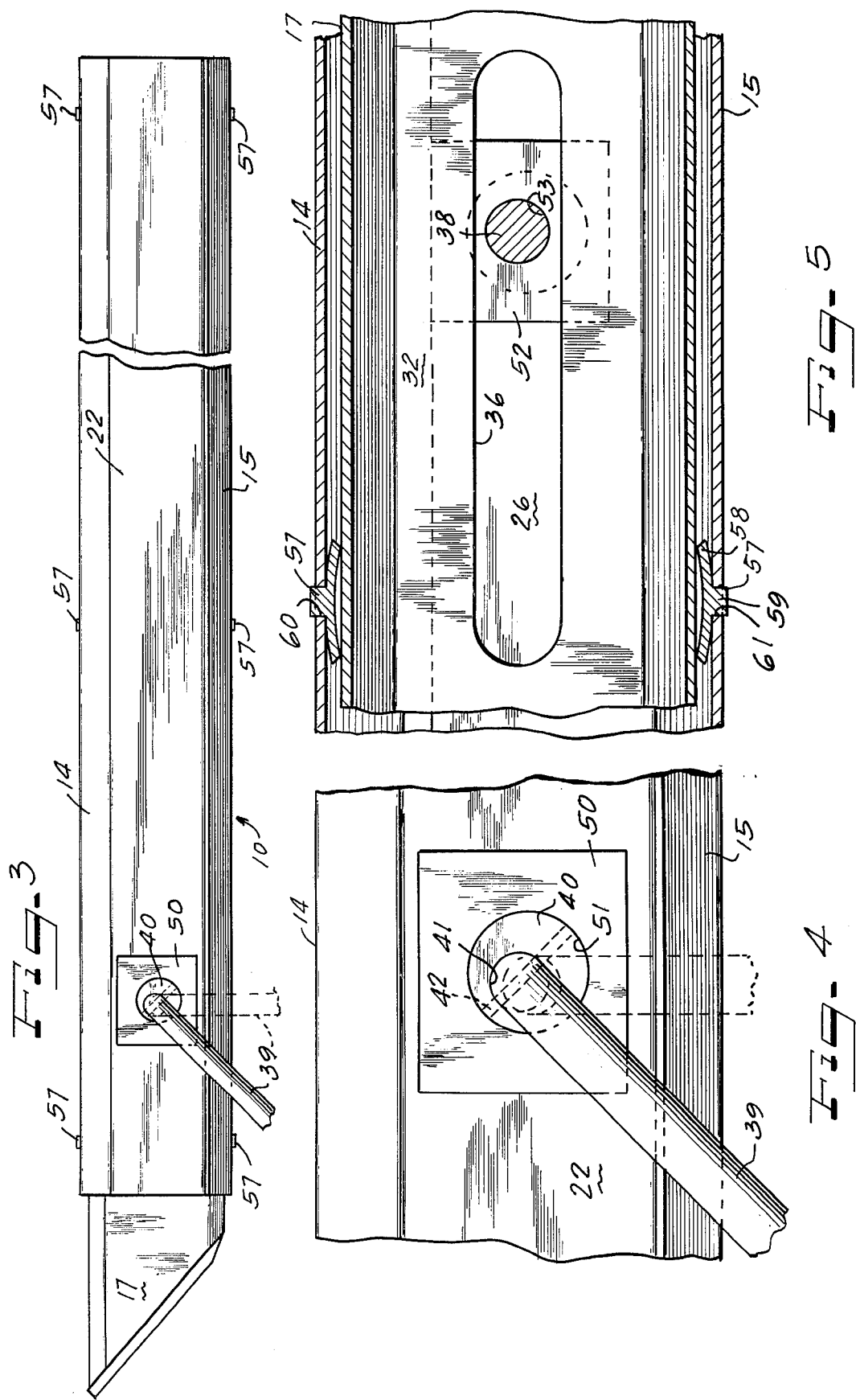

EXTENSIBLE SUPPORT STRUCTURE

BACKGROUND OF THE INVENTION

1. Field of the Invention

The present invention is directed to an extensible support structure particularly adapted for supporting a steering column in adjustable positions with respect to a vehicle frame.

2. Prior Art

In recent years, various proposals have been suggested for providing adjustable steering columns. For example, tiltable steering colums have been suggested to facilitate the entry of the driver to the driving seat. Other suggested structures include steering wheels which can be axially adjusted to enable the desired position of the steering wheel for a particular driver.

In the commercial vehicles, it is often desirable that the steering wheel and steering column remain in substantially the same orientation while being adjusted to various positions relative to the dashboard or frame structure. One method proposed for obtaining an incremental adjustment of the position the steering wheel and column while maintaining the desired orientation thereof is disclosed in the U.S. Pat. No. 3,678,778, which issued to Donald W. Groves on July 25, 1972.

In providing a device for adjusting the position of a steering column and wheel assembly relative to the dashboard, it is desirable to have a device which allows an infinite variation in the distance of the assembly from the dashboard within a prescribed range. It is also desirable to provide an extensible structure which is held in the desired position by a frictional locking mechanism which will yield under a predetermined force such as occurring during a collision of the vehicle.

SUMMARY OF THE INVENTION

The present invention is directed to an extensible support structure for supporting a device such as a steering column and wheel assembly in an adjustable position relative to a structural member such as a frame member and which support structure enables an infinite variation in the position without varying the orientation of the device. The extensible support structure for accomplishing this comprises a housing have at least one inner surface defining an elongated passageway having a wall surface with at least one discontinuity extending the length of the passageway so that the cross section of the passage can be contracted and expanded, a first elongated member telescopically received in the elongated passageway and being free to assume an infinitely variable axial position with respect to the housing and means for contracting the cross section of the passageway so that portions of the wall forming the passageway clampingly engage the first member to frictionally lock the member in a selected axial position. Preferably, the housing is formed by a pair of elongated members each having a U-shaped cross section which members are arranged with the legs of one of the pair of members received in the legs of the other of the pair and the means for forcing the pair of members together comprises a rod extending through aligned apertures in the legs of each of the members with cam members disposed on the rod to engage the aperture of one of the pair of members so that rotation of the rod in one direction moves the pair of members of the housing into clamping engagement on the first member and the movement in the opposite direction releases the clamping engagement. Preferably, the rod extends through slots provided in the first member which rod limits the range of infinitely variable positions of the first member in the housing.

BRIEF DESCRIPTION OF THE DRAWINGS

FIG. 3 is a plan view of a support structure of the present invention in an unextended position;

FIG. 4 is an enlarged plan view of a cam arrangement of the support structure of the present invention; and FIG. 5 is a partial cross sectional view taken on lines V—V of FIG. 2.

DESCRIPTION OF THE PREFERRED EMBODIMENTS

Figures 1, 2:
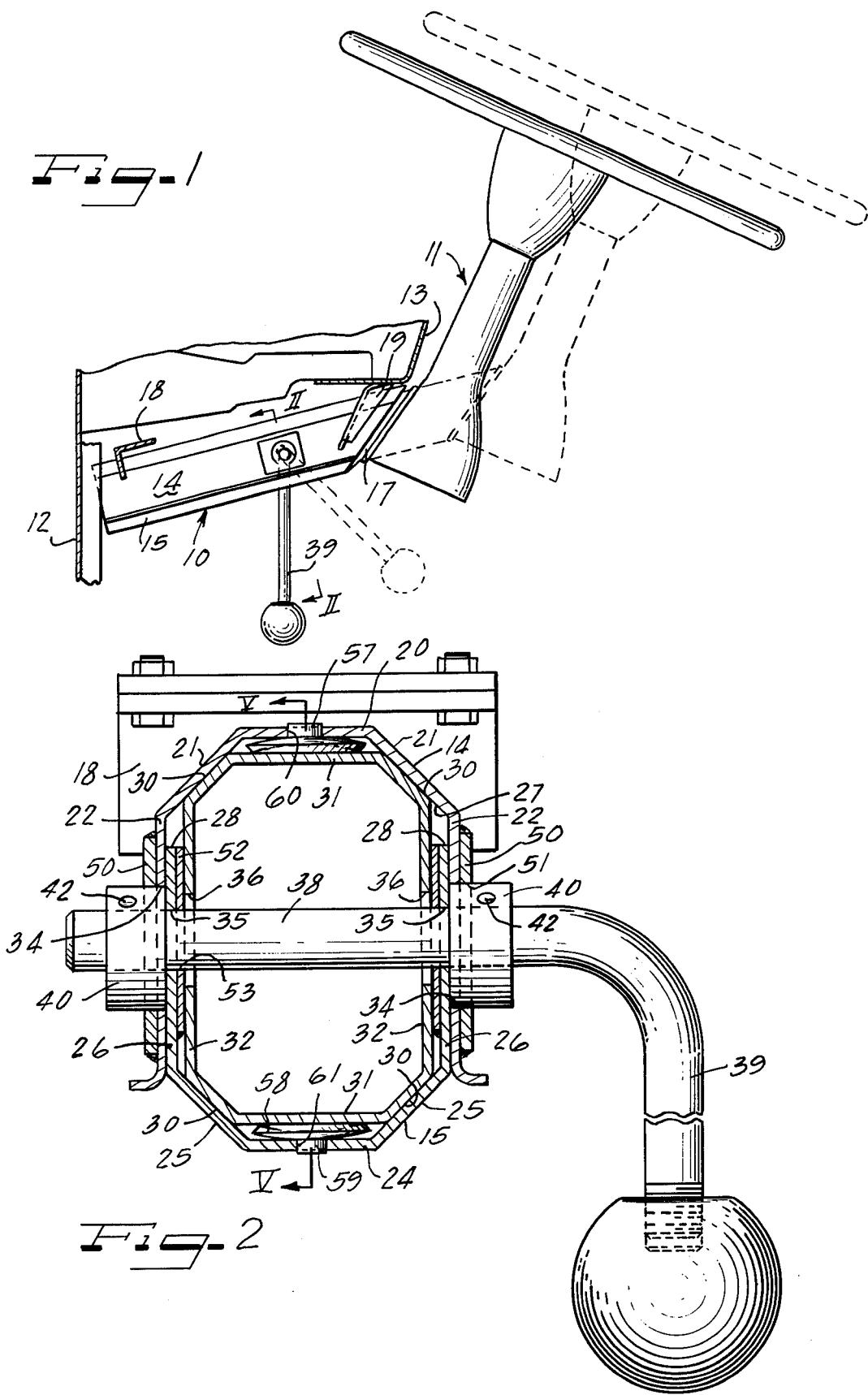
FIG. 1 is a plan view of the extensible support structure of the present invention utilized for positioning a steering column and which assembly with respect to the dashboard of the vehicle.
FIG. 2 is a cross sectional view with portions in elevation for purposes of illustration of the extensible support structure of the present invention taken on lines II—II of FIG. 1.

The principles of the present invention are particularly useful in an extensible support structure generally indicated at 10 in FIG. 1 and illustrated as supporting a device such as a steering column and wheel assembly II in adjustable positions with respect to structural members such as a forward wall 12 and dashboard 13 of the motor vehicle. The assembly II is connected by a conventional linkage, not illustrated, to the dirigible wheel of the vehicle.

The extensible support structure 10 includes a housing formed by a pair of elongated members 14 and 15 and a third member 17 telescopically received in the housing. One end of the member 17 extends out of the housing and is adapted for connection to the steering column and wheel assembly and, as illustrated, the one end is sloped to provide the desired orientation of the assembly II. The housing is rigidly connected beneath the dashboard 13 by mounting means, such as brackets 18 and 19, which engage the elongated member 14. Thus telescopic movement of the member 17 in the housing shifts the assembly II relative to the dashboard 13 as illustrated in dash lines.

As best illustrated in FIG. 2, the elongated member 14 has a U-shaped cross section with a bight portion 20 connected at each side by a flat wall portion 21 to a parallel extending leg 22. In a similar manner, the elongated portion 15 has a bight portion 24 connected on each edge by flat wall portions 25 to parallel extending legs 26. The two members 14 and 15 are arranged with the legs 26 of the elongated member 15 received between the legs 22 of the member 14 to form an elongated passageway 27 having a wall surface with a discontinuity 28 adjacent each of the two points of overlap of the legs 22 and 26. The passageway 27 has a cross section which is contractable and expansible due to relative movement between the members 14 and 15.

The third member 17 is illustrated as having at least four flat surfaces 30 which are engaged by the flat portions 21, 21, of the member 14 and the portions 25, 25 of the member 15 respectively. As illustrated, the member 17 has eight sides with two horizontal sides 31 which are adjacent the bight portions 20 and 21, respectively, and a pair of vertically extending sides or walls 32, 32 which are adjacent the legs 26.

To clamp the pair of members 14 and 15 onto the third member 17 to provide a frictional locking or clamping of the third member 17 in the desired axial position within the housing, clamping means are provided. As illustrated in FIG. 2, each of the legs 22 is provided with an aperture 34 and each of the legs 26 is provided with an aperture 35. Each of the walls 32 of the third member 17 have elongated slots 36 (best illustrated in FIG. 5). The means for forcing the pair of members 14 and 15 into clamping engagement on the member 17 includes a rod 38 extending through the aligned apertures 34 and 35 as well as the aligned slots 36. The rod 38 terminates at one end with a right angle bend to form a lever 39 and carries a pair of eccentrically mounted cam members 40. Each of the cam members 40, which is best illustrated in FIG. 4, has a circular configuration of substantially the same size as the apertures 34 and have an eccentrically disposed aperture 41 which receives the rod 38. To lock the cam member 40 on the rod 38 in the desired eccentric position, a pin 42 extends through the cam member and the rod portion to prevent relative rotational movement therebetween.

The lever 39 of the rod 38 is movable between a locking or clamping position (FIG. 4) to a release or unclamping position illustrated in broken lines in FIG. 4. During rotation of the rod 38, the center of the cam 40 and the axis of the rod 38 rotate about each other so that when the lever 39 moves to the locking position, the rod moves the legs 26 of the second member 15 toward a bight portion 20 of the first elongated member 14. With this clamping movement, the inner surfaces on portions 21,21 of the first elongated member and the inner surfaces of the portions 25,25 of the second member 15 engage the wall surfaces 30 of the third member 17 to clamp the member 17 in the passageway 27. The movement of the pair of members 14 and 15 into a clamping position produce a frictional locking force to hold or lock the member 17 in a fixed postion in the housing. The frictional locking force can be selected to yield when subjected to a predetermined force such as occurs during a collision.

Since the elongated members 14 and 15 are preferably formed of sheet metal, each leg 22 of the member 14 is reinforced by a plate or pad 50 welded or attached to an outer surface of the leg to surround the aperture 34. The pad 50 has an aperture 51 of the size of the aperture 34 and which is aligned therewith. In a similar manner, each of the legs 26 is reinforced at the aperture 25 by a pad or plate 52 having an aperture 53 aligned with the apertures 35 (FIG. 5). The pads 52 are attached to an inner surface of leg 26 by welding. By providing the pads 50, the surfaces engaged by the cam 40 on each of the legs 22 is increased. In a similar manner, the surface on which the rod 38 act on the leg 26 is substantially increased by the pads 52.

As mentioned hereinabove, the rod 38 passes through slots 36 in the walls 32 of the member 17. As illustrated in FIG. 5, the slots 36 are elongated and allow the telescopic movement of the element 17 within the housing formed by the members 14 and 15 within a predetermined range depending on the length of the slots 36. Thus, the member 17 can assume any infinite number of positions within a given range determined by the length of the slots 36 within the housing which is defined by the members 14 and 15.

The rod portion 38 of the means for forcing the two members 14 and 15 together also acts to loosely interconnect the members 14 and 15 and the third member 17. When the lever arm 39 is in the unlocking position such as illustrated in bold lines in FIG. 1, the rod portion 38 and the cams 40 act as means to positively expand the cross section of the passageway to enable adjustment of the axial position of the elongated member 17 to be accomplished. To prevent the member 17 from sliding into the housing formed by the members 14 and 15, it has been found advisable to provide at least one biasing means to provide a preloading force on the member 17 to maintain the member 17 in the adjusted position until the operator can actuate the lever 39 to the locking or clamping position. The biasing means is preferably a plurality of molded plastic members 57 having a resilient portion 58 and a stub portion 59 which is received in an aperture 60 in bight portions 20 or aperture 61 in bight portion 24. As illustrated in FIG. 3, each of the pair of members 14 and 15 are provided with three members 57 which are spaced along each member 14 and 15. Preferably, the material of the member 57 is a resilient plastic having a low coefficient friction for example polytetrafluoroethylene. Thus, the member 57 in addition to preloading or applying a force to maintain the third member 17 in the desired axial position until the lever 39 is moved to the locking position also aid in reducing the friction between the member 17 and the walls of the passageway 27 when the operator is shifting the column and wheel arrangement 11 to the desired position.

Although various minor modifications may be suggested by those versed in the art, it should be understood that we wish to embody within the scope of the patent granted hereon all such modifications that reasonably and properly come within the scope of our contribution to the art.

We claim:

1. An extensible support structure for supporting a device in adjustable positions relative to a structural member, said support structure comprising an elongated housing having means for attaching the housing to the structural member, said housing having at least one inner surface defining an elongated passageway having a wall with at least one discontinuity extending the length of the passageway so that the cross section of the passageway can be contracted and expanded, a first elongated member telescopically received in the elongated passageway and being free to assume an infinite number of axial positions in the elongated passageway with respect to the housing, said first member having one end extending from the passageway and adapted for attachment to the device, and means for contracting and expanding the cross section of the passageway so that portions of the wall forming the passageway clampingly engage the first member to frictionally lock said first member in one of the axial positions, said means for contracting and expanding comprising a cam disposed on a rotatable shaft, said shaft engaging one side of the discontinuity and the cam engaging the other side so that rotation of the cam in one direction positively contracts the cross section of the passageway and rotation of the cam in the opposite direction positively expands the cross section of the passageway to enable axial positioning of the first member therein.

2. An extensible support structure according to claim 1, wherein the housing is formed of a pair of elongated members and includes means loosely interconnecting said pair of members to form the passageway with a pair of longitudinally extending discontinuities in the wall of the passageway and wherein the means for contracting forces the pair of members of the housing into clamping engagement on the first member.

3. An extensible support sutructure according to claim 2, wherein the first member has at least two flat clamping surfaces and wherein each of said pair of members forming the housing has at least one flat clamping surface engaging a respective flat clamping surface of the first member as the pair of members are moved into clamping engagement thereon.

4. An extensible support structure for supporting a device in adjustable positions relative to a structural member, said support structure comprising a first elongated member, a pair of elongated members, means loosely interconnecting said pair of members to form a housing having an elongated passageway with a wall surface with a pair of longitudinally extending discontinuties extending the length of the passageway so that the cross section of the passageway can be contracted and expanded, said housing having means for attaching the housing to the structural member, each of the pair of members forming the housing having a substantially U-shaped configuration with the legs of one of the pair of members disposed in the legs of the other of said pair, said first member being telescopically received in the elongated passageway and being free to assume an infinite number of axial positions in the elongated passageway with respect to the housing and having one end extending from the passageway and adapted for attaching to the device, and means for positively expanding and contracting the cross section of the passageway to allow axial positions of the first member therein and to clampingly engage the first member and frictionally lock said first member in one of the axial positions, said means for interconnecting and said means for expanding and contracting the two members comprising a rod extending through aligned apertures in said pair of members and through a pair of elongated slots in said first member, said rod having mounted thereon a pair of cam members engaged in the aligned apertures of the other of said pair of members, wherein rotation of said rod causes the cam members and rod to force the pair of members together into clamping engagement on the first member, and wherein the coaction of the rod extending through the slots in the first member limits the range of axial positions of the first member in the passageway.

5. An extensible support structure according to claim 4, wherein the first member has at least four flat surfaces extending along the length thereof, and wherein each of the pair of members forming the housing have a pair of flat surfaces for engaging a respective pair of flat surfaces of the first member during a clamping action.

6. An extensible support structure according to claim 5, wherein at least one of said pair of members includes biasing means for applying a preloading on the first member when the structure is in an unclamped condition.

7. An extensible support structure for supporting a device such as a steering column in adjustable positions relative to a structural member such as a dashboard of a motor vehicle, said support structure comprising first and second elongated members each having, a U-shaped configuration with the legs of the second member received within the legs of the first member to form an elongated housing with an elongated passageway having a cross section which is both contractable and expansible, means for interconnecting said first and second members to form the elongated housing, one of said first and second members having means adapted for attaching the housing to the structural member, a third elongated member telescopically received in the elongated passageway and being free to assume an infinite number of axial positions in the elongated passageway with respect to the housing, said third member having one end extending from the passageway adapted for attaching to a steering column, and means for forcing the first and second members forming the housing into clamping engagement on the third member to frictionally lock said third member in one of the axial positions, said means for interconnecting and said means for forcing the first and second members together comprising a rod extending through aligned apertures in the legs of said first and second members with cam members disposed thereon for engaging the apertures of one of said members so that rotation of said rod forces the first and second members into clamping engagement on the third member.

8. An extensible support structure according to claim 7, wherein the third member has a pair of elongated slots receiving said rod, said slots defining the range of infinite axial positions of the third member within the passageway formed by the first and second members.

9. An extensible support structure according to claim 7, wherein said third member has at least four flat surfaces extending the length thereof, and each of said first and second members has at least a pair of flat surfaces for engaging a pair of the flat surfaces of the third member when said first and second members are moved to a clamping engagement thereon.

10. An extensible support structure according to claim 9, where at least one of the first and second members includes biasing means for applying a preloading force on the third member when the first and second members are in a released position.

11. An extensible support structure according to claim 10, wherein the first and second members are formed of sheet metal and wherein the legs of the members are provided with reinforcing pads adjacent the apertures therein to increase the surface acted on by the cam members and the rod during clamping and unclamping of the third member.

* * * * *